United States Patent
Kim et al.

(10) Patent No.: US 8,885,068 B2
(45) Date of Patent: Nov. 11, 2014

(54) MOBILE TERMINAL AND CONTROL METHOD FOR THE SAME

(75) Inventors: Youngkoen Kim, Seoul (KR); Sungwook Ha, Seoul (KR); Kyungsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 89 days.

(21) Appl. No.: 13/614,849

(22) Filed: Sep. 13, 2012

(65) Prior Publication Data

US 2013/0141605 A1   Jun. 6, 2013

(30) Foreign Application Priority Data

Dec. 6, 2011 (KR) .................... 10-2011-0129759

(51) Int. Cl.
*H04N 5/262* (2006.01)
*H04N 5/222* (2006.01)
*G06F 3/041* (2006.01)

(52) U.S. Cl.
USPC .................. 348/239; 348/333.01; 345/178

(58) Field of Classification Search
CPC .................................. H04N 5/23219
USPC .................. 348/239, 371; 382/118, 103
See application file for complete search history.

(56) References Cited

U.S. PATENT DOCUMENTS

| 7,978,261 | B2* | 7/2011 | Ojima et al. | 348/371 |
| 2004/0175041 | A1* | 9/2004 | Miller | 382/190 |
| 2004/0223649 | A1* | 11/2004 | Zacks et al. | 382/218 |
| 2010/0007665 | A1* | 1/2010 | Smith et al. | 345/473 |
| 2013/0129141 | A1* | 5/2013 | Wang et al. | 382/103 |

* cited by examiner

*Primary Examiner* — Joel Fosselman
(74) *Attorney, Agent, or Firm* — Birch, Stewart, Kolasch & Birch, LLP

(57) ABSTRACT

The present disclosure relates to a mobile terminal and a control method thereof capable of editing an image. A mobile terminal according to an embodiment of the present disclosure may include a display unit configured to display an image, a detection unit configured to detect a facial image from the image, and a controller configured to retrieve facial data corresponding to the facial image, and edit the facial image using the retrieved facial data.

19 Claims, 15 Drawing Sheets

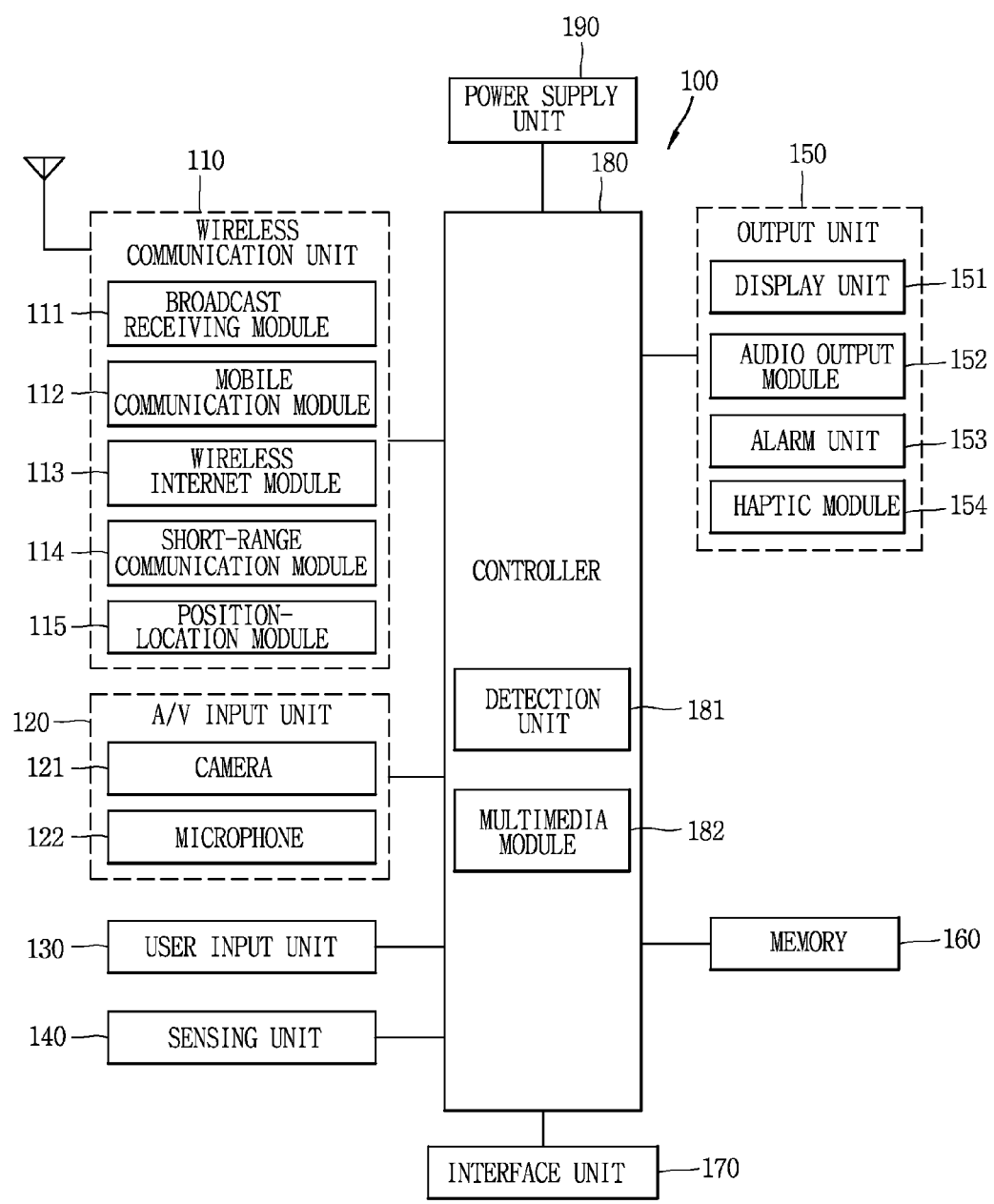

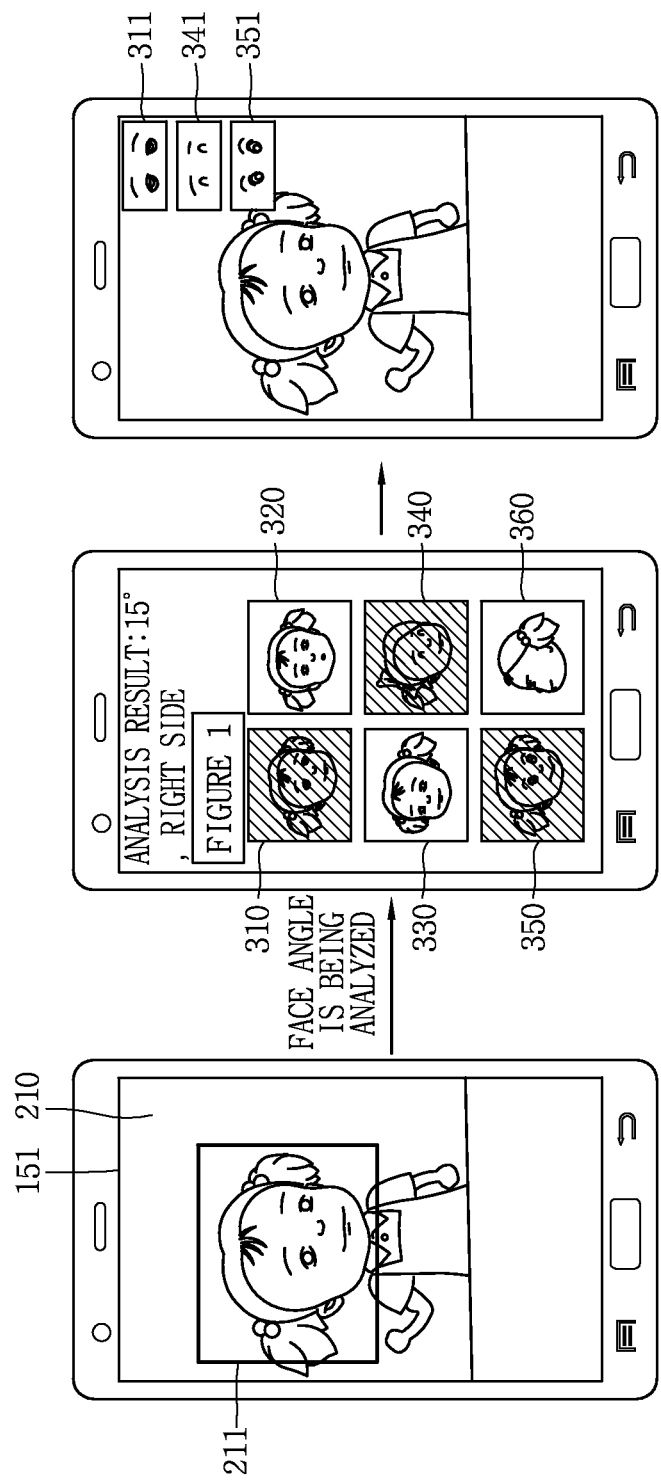

MOBILE TERMINAL AND CONTROL METHOD FOR THE SAME

RELATED APPLICATION

Pursuant to 35 U.S.C. §119(a), this application claims the benefit of earlier filing date and right of priority to Korean Application No. 10-2011-0129759, filed on Dec. 6, 2011, the contents of which is incorporated by reference herein in its entirety.

BACKGROUND OF THE INVENTION

1. Field of the Invention

The present disclosure relates to a mobile terminal and a control method thereof capable of editing an image.

2. Description of the Related Art

A mobile terminal may be configured to perform various functions. Examples of the various functions may include a data and voice communication function, a function of capturing a picture or video through a camera, a voice storage function, a function of reproducing a music file through a speaker system, a function of displaying an image or video, and the like. Some mobile terminals may include an additional function capable of implementing a game, and other mobile terminals may be implemented as a multimedia player. Moreover, recent mobile terminals may receive a multicast signal to view a video or television program.

Furthermore, efforts for supporting and enhancing the functions of the mobile device have been continued. The foregoing efforts may include the improvement of software and hardware as well as the change or improvement of structural elements constituting a mobile device.

In addition, when a user's face in an image captured using a camera in the mobile terminal does not suit his or her taste, it was burdensome to delete the captured picture or execute an additional program to modify the image.

SUMMARY OF THE INVENTION

An object of the present disclosure is to provide a mobile terminal and control method thereof capable of editing an image in a natural manner using an image having the same identity as a facial image desired to be edited.

Another object of the present disclosure is to provide a mobile terminal and control method thereof capable of providing the best facial image all the time to the user.

In order to accomplish the foregoing objective, a mobile terminal according to an embodiment of the present disclosure may include a display unit configured to display an image, a detection unit configured to detect a facial image from the image, and a controller configured to retrieve facial data corresponding to the facial image, and edit the facial image using the retrieved facial data.

In an embodiment, the controller may retrieve the facial data based on a user's command, or retrieve the facial data when the facial image corresponds to an edit condition.

In an embodiment, the controller may receive at least one edit region set in the facial image from the user, and retrieve facial data corresponding to the set edit region.

In an embodiment, the edit condition may be on the basis of the visual information of the facial image or the picture quality information of the facial image, and the controller may retrieve facial data corresponding to the edit condition, and edit a region corresponding to the edit condition in the facial image using the retrieved facial data.

In an embodiment, when eye blinking is detected from the facial image, the controller retrieves an eye image from facial data associated with the facial image, and edit the facial image such that the retrieved eye image is located at a region from which the eye blinking is detected.

In an embodiment, when the facial data is retrieved, the controller may output a preview screen on which the retrieved facial data is applied to the facial image.

In an embodiment, when a plurality of facial data are retrieved, the preview screen may be switched to different preview screens to which the plurality of facial data are applied, respectively, based on the user's selection.

In an embodiment, the controller may first output a preview screen to which facial data having the highest priority is applied among the plurality of facial data.

In an embodiment, the controller may analyze a face angle of the detected facial image, and retrieve an image corresponding to the analyzed face angle among the facial data.

In an embodiment, the detection unit may detect a facial image from an image received through a camera, and the controller may detect picture quality information from facial data corresponding to the detected facial image, and changes a setting value of the camera such that the picture quality of the facial image corresponds to the picture quality information.

In an embodiment, the controller may change at least one of luminous intensity, white balance, and exposure value for the camera.

In an embodiment, the facial data may contain a three-dimensional image, and the controller may change an angle of the facial image using the three-dimensional image.

In an embodiment, information associated with changeable angles and directions through the three-dimensional image may be displayed on the display unit, and the controller may edit the facial image at an angle and in a direction according to the user's selection among the displayed information.

In an embodiment, the three-dimensional image may be generated through a combination of a plurality of images for the same figure.

In an embodiment, the controller may display a plurality of images associated with the same figure's face, and generate the three-dimensional image using a front, a left side and a right side image selected by the user among the displayed plurality of images.

In an embodiment, the facial data may be an image corresponding to the figure's face, and the image may be collected from a memory or website, and the controller may classify the collected images into a plurality of groups based on the figure.

In an embodiment, the controller may detect a group containing the figure's image corresponding to the detected facial image among the plurality of groups, and edit the facial image using at least one of images contained in the group.

A method of controlling a mobile terminal according to an embodiment of the present disclosure may include outputting an image and detecting a facial image from the image based on the user's selection, retrieving facial data corresponding to the detected facial image, and editing the facial image using the retrieved facial data.

In an embodiment, said retrieval step may receive at least one edit region set in the facial image from the user, and retrieve facial data corresponding to the set edit region.

A method of controlling a mobile terminal according to an embodiment of the present disclosure may include displaying an image captured through a camera to a display unit, receiving an edit command for editing the image using a preset best image, detecting a facial image from the image based on the received edit command, retrieving the best image having facial data corresponding to the detected facial image, and editing the image using the retrieved best image.

In an embodiment, the method may further include outputting a popup window for selecting whether to edit the captured image, and receiving an edit command for editing the image through the popup window when an image is captured through the camera.

In an embodiment, a first icon for setting the image to the best image may be contained in the popup window, and the method may further include extracting a facial image from the image, and storing facial data associated with the extracted facial image when the first icon is selected by the user.

In an embodiment, the method may further include outputting a popup window for selecting whether to set the image to the best image when there is no best image having facial data corresponding to the detected facial image in the step of retrieving the best image as a result of the retrieval, and extracting a facial image from the image, and storing the extracted facial image when setting the image to the best image is selected through the popup window.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a block diagram illustrating a mobile terminal according to an embodiment of the present disclosure;

FIG. 8 is a conceptual diagram for explaining a method of retrieving facial data corresponding to a specific condition in a mobile terminal according to an embodiment disclosed in the present disclosure;

DETAILED DESCRIPTION OF THE INVENTION

Figure 2A:
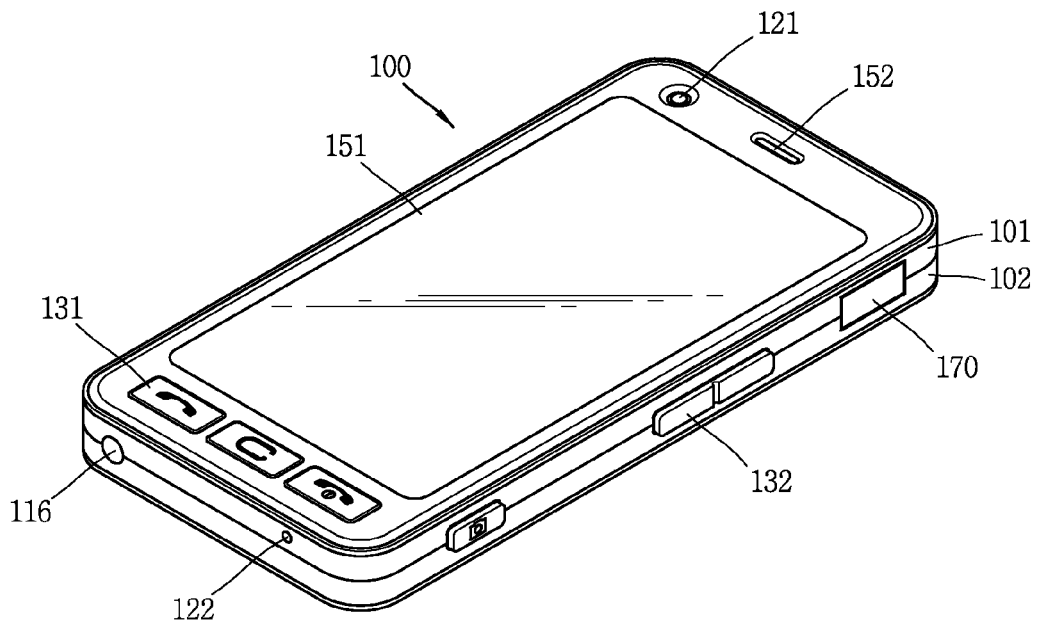
FIGS. 2A and 2B are front perspective views illustrating an example of a mobile terminal according to an embodiment of the present disclosure.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile terminal disclosed herein may include a portable phone, a smart phone, a laptop computer, a digital broadcast terminal, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal according to an embodiment disclosed herein.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile terminal may be implemented with greater or less number of elements than those illustrated elements.

Hereinafter, the constituent elements will be described in sequence.

The wireless communication unit 110 typically includes one or more elements allowing radio communication between the mobile terminal 100 and a wireless communication system, or allowing radio communication between radio communication the mobile terminal 100 and a network in which the mobile terminal 100 is located. For example, the wireless communication unit 110 may include a broadcast receiving module 111, a mobile communication module 112, a wireless Internet module 113, a short-range communication module 114, a location information module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile terminal 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like. The broadcast receiving module 111 is, of course, configured to be suitable for every broadcast system that provides a broadcast signal as well as the above-mentioned digital broadcast systems.

The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. Here, the radio signal may include a voice call signal, a video call signal and/or various types of data according to text and/or multimedia message transmission and/or reception.

The mobile communication module 112 may be configured to implement an video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 means a module for supporting wireless Internet access. The wireless Internet module 113 may be built-in or externally installed to the mobile terminal 100. Here, it may be used a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. Here, it may be used a short-range communication technology including Bluetooth, Radio Frequency IDentification (RFID), Infrared Data Association (IrDA), Ultra WideBand (UWB), ZigBee, and the like.

The location information module 115 is a module for checking or acquiring a location of the mobile terminal, and there is a GPS module as a representative example.

Referring to FIG. 1, the A/V (audio/video) input unit 120 receives an audio or video signal, and the A/V (audio/video) input unit 120 may include a camera 121 and a microphone 122. The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile terminal.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed state of the mobile terminal 100, a location of the mobile terminal 100, an orientation of the mobile terminal 100, and the like, and generates a sensing signal for controlling the operation of the mobile terminal 100. For example, when the mobile terminal 100 is a slide phone type, it may sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal, and the output unit 150 may include the display unit 151, an audio output module 152, an alarm unit 153, a haptic module 154, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a terminal body through a region occupied by the display unit 151 of the terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an interlayer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor may be arranged at an inner region of the mobile terminal 100 covered by the touch screen, or near the touch screen. The proximity sensor indicates a sensor to sense presence or absence of an object approaching to a surface to be sensed, or an object disposed near a surface to be sensed, by using an electromagnetic field or infrared rays without a mechanical contact. The proximity sensor has a longer lifespan and a more enhanced utility than a contact sensor.

The examples of the proximity sensor may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. The haptic module 154 may be implemented in two or more in number according to the configuration of the mobile terminal 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 for reproducing multimedia data. The multimedia module 181 may be implemented in an integrated manner within the controller 180 or may be implemented in a separate manner from the controller 180.

Furthermore, the controller 180 can perform a pattern recognition processing so as to recognize writing or drawing input on the touch screen as text or image.

Furthermore, the controller 180 may implement a lock state for limiting the user's control command input to applications when the state of the mobile terminal satisfies the prescribed condition. Furthermore, the controller 180 may control a lock screen displayed in the lock state based on a touch input sensed over the display unit 151 (hereinafter, referred to as a "touch screen") in the lock state.

The power supply unit 190 receives external power and internal power under the control of the controller 180 to provide power required by various components.

Various embodiments described herein may be implemented in a medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units designed to perform the functions described herein. In some cases, such embodiments may be implemented in the controller 180 itself.

For software implementation, the embodiments such as procedures or functions may be implemented together with separate software modules. The software modules may perform at least one function or operation described herein.

Software codes can be implemented by a software application written in any suitable programming language. The software codes may be stored in the memory 160 and executed by the controller 180.

Hereinafter, a mobile terminal according to an embodiment of the present disclosure described in FIG. 1, or a mobile terminal disposed with constituent elements of the mobile terminal, or the structure of a mobile terminal will be described.

Figure 2B:
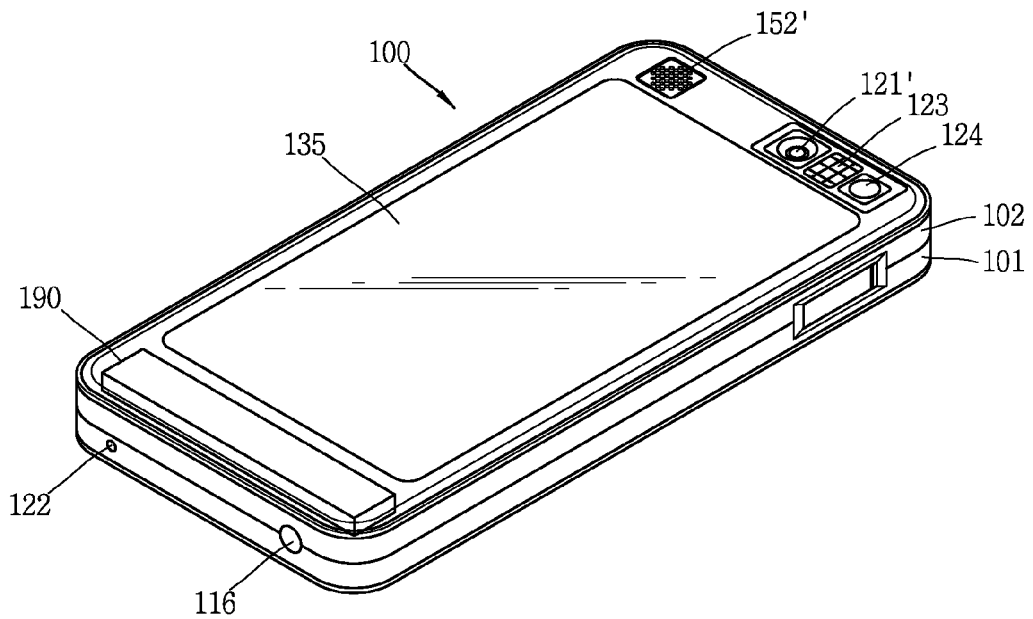

FIG. 2A is a front perspective view illustrating an example of a mobile terminal according to an embodiment of the present disclosure or an example of a mobile terminal, and FIG. 2B is a rear perspective view illustrating the mobile terminal in FIG. 2A.

The mobile terminal 100 disclosed herein is provided with a bar-type terminal body. However, the present invention is not only limited to this type of terminal, but also applicable to various structures of terminals such as slide type, folder type, swivel type, swing type, and the like, in which two and more bodies are combined with each other in a relatively movable manner.

According to the drawing, the terminal body 100 (hereinafter, referred to as a "body") may include a front surface, a lateral surface, and a rear surface. Furthermore, the body may include both ends thereof formed along the length direction.

The body 100 includes a case (casing, housing, cover, etc.) forming an appearance of the terminal. In this embodiment, the case may be divided into a front surface (hereinafter, referred to as a "front case") 101 and a rear surface (hereinafter, referred to as a "rear case") 102. Various electronic components may be incorporated into a space formed between the front case 101 and rear case 102. At least one middle case may be additionally disposed between the front case 101 and the rear case 102.

The cases may be formed by injection-molding a synthetic resin or may be also formed of a metal material such as stainless steel (STS), titanium (Ti), or the like.

A display unit 151, an audio output module 152, a camera 121, a user input unit 130 (130/131, 132), a microphone 122, an interface 170, and the like may be arranged on the terminal body 100, mainly on the front case 101.

The display unit 151 occupies a most portion of the front case 101. The audio output unit 152 and the camera 121 are disposed on a region adjacent to one of both ends of the display unit 151, and the user input unit 131 and the microphone 122 are disposed on a region adjacent to the other end thereof. The user interface 132 and the interface 170, and the like, may be disposed on a lateral surface of the front case 101 and the rear case 102. On the contrary, the microphone 122 may be disposed at the other end of the body 100.

The user input unit 130 is manipulated to receive a command for controlling the operation of the portable terminal 100, and may include a plurality of manipulation units 131, 132. The manipulation units 131, 132 may be commonly designated as a manipulating portion, and any method may be employed if it is a tactile manner allowing the user to perform manipulation with a tactile feeling.

The content inputted by the manipulation units 131, 132 may be set in various ways. For example, the first manipulation unit 131 may receive a command, such as start, end, scroll, or the like, and the second manipulation unit 132 may receive a command, such as controlling a volume level being outputted from the audio output unit 152, or switching it into a touch recognition mode of the display unit 151. A broadcast antenna 116 can also be provided.

Referring to FIG. 2B, an audio output unit 152' may be additionally disposed on a rear surface, namely, a rear case 102, of the terminal body. The audio output unit 152' together with the audio output unit 152 (refer to FIG. 2A) can implement a stereo function, and it may be also used to implement a speaker phone mode during a phone call.

Furthermore, a power supply unit 190 for supplying power to the mobile terminal 100 may be mounted on a rear surface of the terminal body. The power supply unit 190 may be configured so as to be incorporated in the terminal body, or directly detachable from the outside of the terminal body.

Furthermore, a touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

Furthermore, a camera 121' may be additionally mounted on the rear case 102 of the terminal body. The camera 121' has an image capturing direction, which is substantially opposite to the direction of the camera 121 (refer to FIG. 2A), and may have different pixels from those of the first video input unit 121.

For example, that the camera 121 may preferably have a relatively small number of pixels enough not to cause a difficulty when the user captures his or her own face and sends it to the other party during a video call or the like, and the camera 121' has a relatively large number of pixels since the user often captures a general object that is not sent immediately. The cameras 121' may be provided in the terminal body 100 in a rotatable and popupable manner.

Furthermore, a flash 123 and a mirror 124 may be additionally disposed adjacent to the camera 121'. The flash 123 illuminates light toward an object when capturing the object with the camera 121'. The mirror allows the user to look at his or her own face, or the like, in a reflected way when capturing himself or herself (in a self-portrait mode) by using the camera 121'.

Furthermore, an audio output unit 152' may be additionally disposed on a rear surface of the terminal body. The audio output unit 152' together with the audio output unit 152 (refer to FIG. 2A) can implement a stereo function, and it may be also used to implement a speaker phone mode during a phone call.

Furthermore, a power supply unit 190 for supplying power to the portable terminal 100 may be mounted on a rear surface of the terminal body. The power supply unit 190 may be configured so as to be incorporated in the terminal body, or directly detachable from the outside of the terminal body.

A touch pad 135 for detecting a touch may be additionally mounted on the rear case 102. The touch pad 135 may be configured in an optical transmission type similarly to the display unit 151. In this case, if the display unit 151 is configured to output visual information from both sides of the display unit 151, then the visual information may be also recognized through the touch pad 135. The information being outputted from the both sides thereof may be controlled by the touch pad 135. In addition, a display may be additionally mounted on the touch pad 135, and a touch screen may be also disposed on the rear case 102.

The touch pad 135 operates in a reciprocal relation to the display unit 151 of the front case 101. The touch pad 135 may be disposed in parallel on a rear side of the display unit 151. The touch pad 135 may have the same or a smaller size as or than that of the display unit 151.

Furthermore, a mobile terminal including at least any one of the above-mentioned constituent elements can edit an image displayed on the display unit 151 using image data having similar information to that of the image.

Hereinafter, a method of editing a facial image using a mobile terminal according to an embodiment of the present disclosure will be described with reference to the accompanying drawings.

Figure 3:
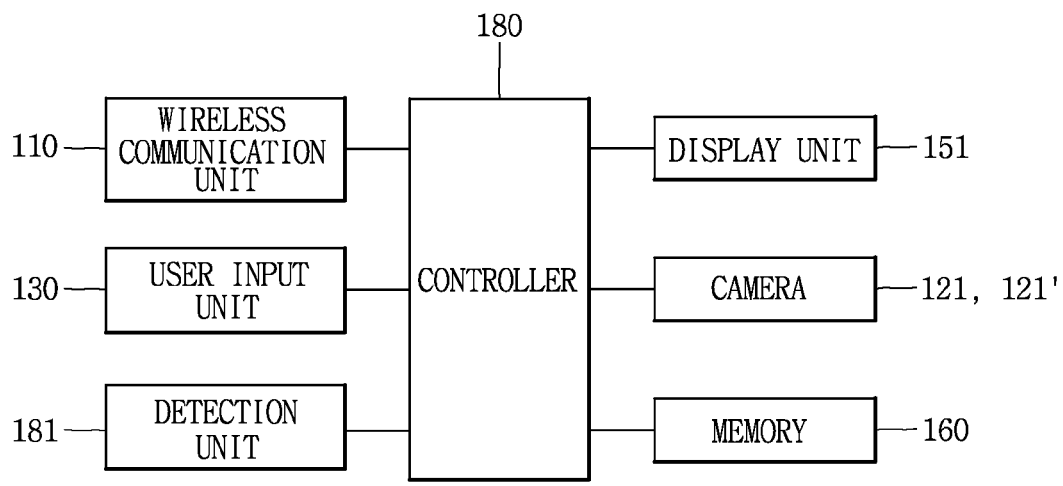
FIG. 3 is a block diagram schematically illustrating a mobile terminal according to an embodiment disclosed in the present disclosure.

FIG. 3 is a block diagram schematically illustrating a mobile terminal 100 according to an embodiment disclosed in the present disclosure. Here, the previous description with reference to FIG. 1 will be omitted.

Referring to FIG. 1, the mobile terminal 100 may include a controller 180, a detection unit 181, a display unit 151, a memory 160, a camera 121 or 121', a user input unit 130, and a wireless communication unit 110.

The display unit 151 displays an image based on the user's selection. Here, the displayed picture or image may include a figure's facial image, and the user may manipulate an image stored in the memory 160 using the user input unit 130 or display unit 151 capable of receiving a touch input, thereby allowing the manipulated image to be displayed on the display unit 151.

Furthermore, the image displayed on the display unit 151 may be an image being input through the camera 121 or 121', or may be an image contained in a web server being connected through the wireless communication unit 110.

The detection unit 181 detects a facial image on an image displayed on the display unit 151. The detection unit 181 may recognize a facial image contained in the image using a face recognition algorithm.

The face recognition algorithm recognizes a figure contained in the image displayed on the display unit 151, allowing a figure to be recognized or detected using the contour or visual information of the figure distinguished from other regions of the image.

The face recognition algorithm may be divided into a face region extraction process for distinguishing a face from the entire image and a face recognition process for discerning whose face the found face is.

The detection unit 181 may discern a face with the distance and shape of his or her eyes, nose and mouth to obtain face recognition information.

The controller 180 retrieves facial data corresponding to the facial image using the facial image detected by the detection unit 181 and face recognition information on the facial image.

In other words, the controller 180 retrieves a figure's facial data having the same identity as a figure corresponding to the facial image contained in an image using the face recognition information.

The facial data can be categorized based on the figure, and the related data are stored in a group corresponding to each figure.

Furthermore, a priority can be set among facial data contained in the same group, and the controller 180 may first output facial data having the highest priority than the other facial data among a plurality of facial data, and use facial data having the highest priority when the facial image is automatically edited.

Furthermore, the priority can be set by the user's selection, and the priority can be set to facial data having the highest use frequency by the controller 180.

Here, facial data relates to a figure's face related image or picture quality information (or color information (RGB, luminance, chroma, brightness, etc.)), and the face related image may be a full facial image or partial image associated with the figure's main appearance, for example, his or her eyes, nose, mouth, ears, eyebrows, and the like. Such a partial image may be automatically divided and stored, or extracted from the full image by the controller 180 as the need arises.

Furthermore, an image to be partially stored can be selected from a full image by the user's selection.

Furthermore, facial data may be stored in the memory 160 or received from an external device, and may be also retrieved through a web server corresponding to a range set by the user via the wireless communication unit 110.

The controller 180 may use all images stored in the memory 160 for facial data or use only images selected by the user for the facial data.

On the other hand, the controller 180 edits a facial image using facial data as described above.

The controller 180 may edit an edit region selected by the user or edit only a region corresponding to the edit condition for the facial image.

When the entire facial image is not edited but only one region of the facial image is edited, the controller 180 may retrieve a partial image corresponding to the one region.

In this case, the controller 180 may first retrieve a group corresponding to a figure corresponding to the face image, and retrieve data corresponding to the one region from facial data contained in the relevant group.

On the other hand, the foregoing edit region and edit condition will be described in more detail below.

As described above, in a mobile terminal according to an embodiment disclosed in the present disclosure, it may be possible to edit a facial image of the user's desired image using facial data that have been stored or collected through the web.

Hereinafter, a method of editing a facial image in the controller 180 will be described in more detail with reference to FIGS. 4 and 5.

Figure 4:
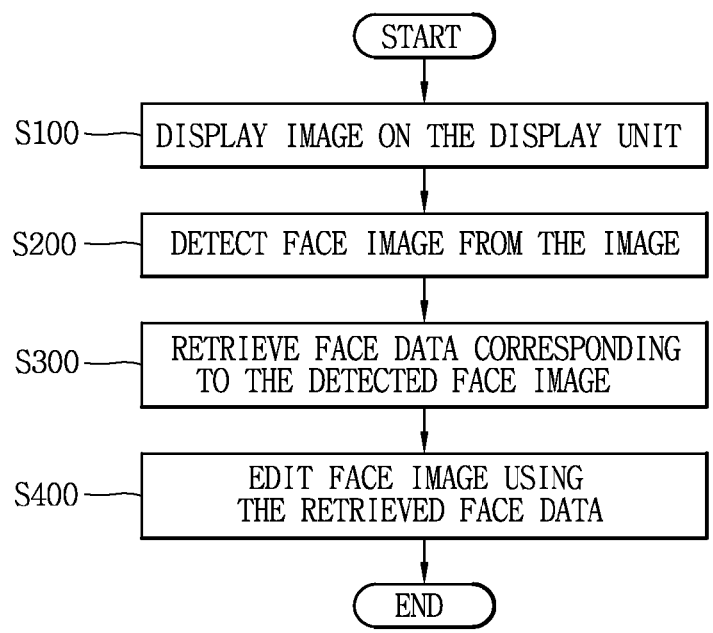
FIG. 4 is a flow chart for explaining a method of controlling a mobile terminal according to an embodiment disclosed in the present disclosure.
Figure 5:
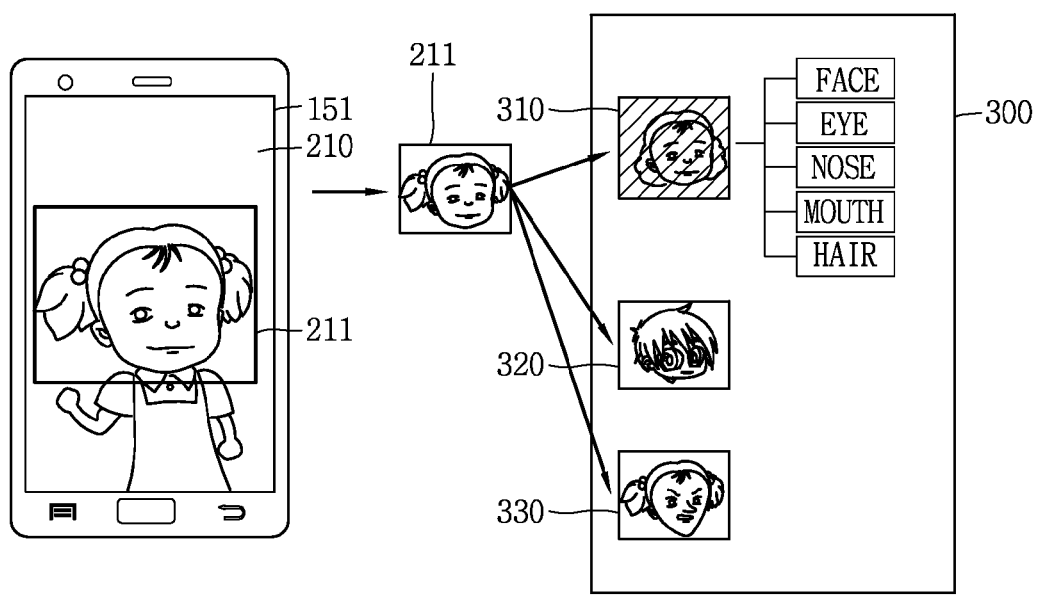
FIG. 5 is a conceptual diagram for explaining a method of editing a facial image in a mobile terminal according to an embodiment disclosed in the present disclosure.

FIG. 4 is a flow chart for explaining a method of controlling a mobile terminal according to an embodiment disclosed in the present disclosure, and FIG. 5 is a conceptual diagram for explaining a method of editing a facial image in a mobile terminal according to an embodiment disclosed in the present disclosure.

First, the controller 180 (refer to FIG. 3) displays an image on the display unit 151 (refer to FIG. 3) (S100). Here, the image displayed on the display unit 151 is an image that has been stored in the memory 160 or downloaded from a web server via the wireless communication unit 110 as described above.

Next, the detection unit 181 (refer to FIG. 3) retrieves a facial image from the image displayed on the display unit 151 using a face recognition algorithm (S200).

For example, as illustrated in FIG. 5, the detection unit 181 detects a facial image 211 from the image 210 displayed on the display unit 151.

Then, the controller 180 retrieves facial data corresponding to the facial image 211 from the memory 160 or a prespecified web (S300; refer to FIG. 4).

Describing a method of retrieving facial data stored in the memory 160 as an example, the memory 160 may include a plurality of facial data 300 as illustrated in FIG. 5.

The memory 160 may be grouped into a plurality of groups (310, 320, 330) based on the figure, and the controller 180 first retrieves a group corresponding to the facial image 211 from the plurality of groups (310, 320, 330), and retrieves facial data required for editing within the retrieved group.

For example, the controller 180 retrieves a first group 310 corresponding to the retrieved facial image 211 among the plurality of groups (310, 320, 330), and selects at least one of facial data associated with a plurality of images contained in the first group 310 or picture quality information to edit the facial image 211 (S400).

As described above, if an image associated with hair style is selected, then the controller 180 edits the facial image 211 using the selected hair style image. As a result, as illustrated in the drawing, the edited image 210' is displayed on the display unit 151.

As described above, the controller 180 may edit a facial image using facial data.

When an image displayed on the display unit 151 is edited by the controller 180 in this manner, it may be on the basis of a control command associated with the user's "image editing", or the image displayed on the display unit 151 may be on the basis of a preset edit condition.

Hereinafter, a process of editing an image displayed on the display unit based on an edit condition or edit region according to an embodiment will be described.

Figure 6A:
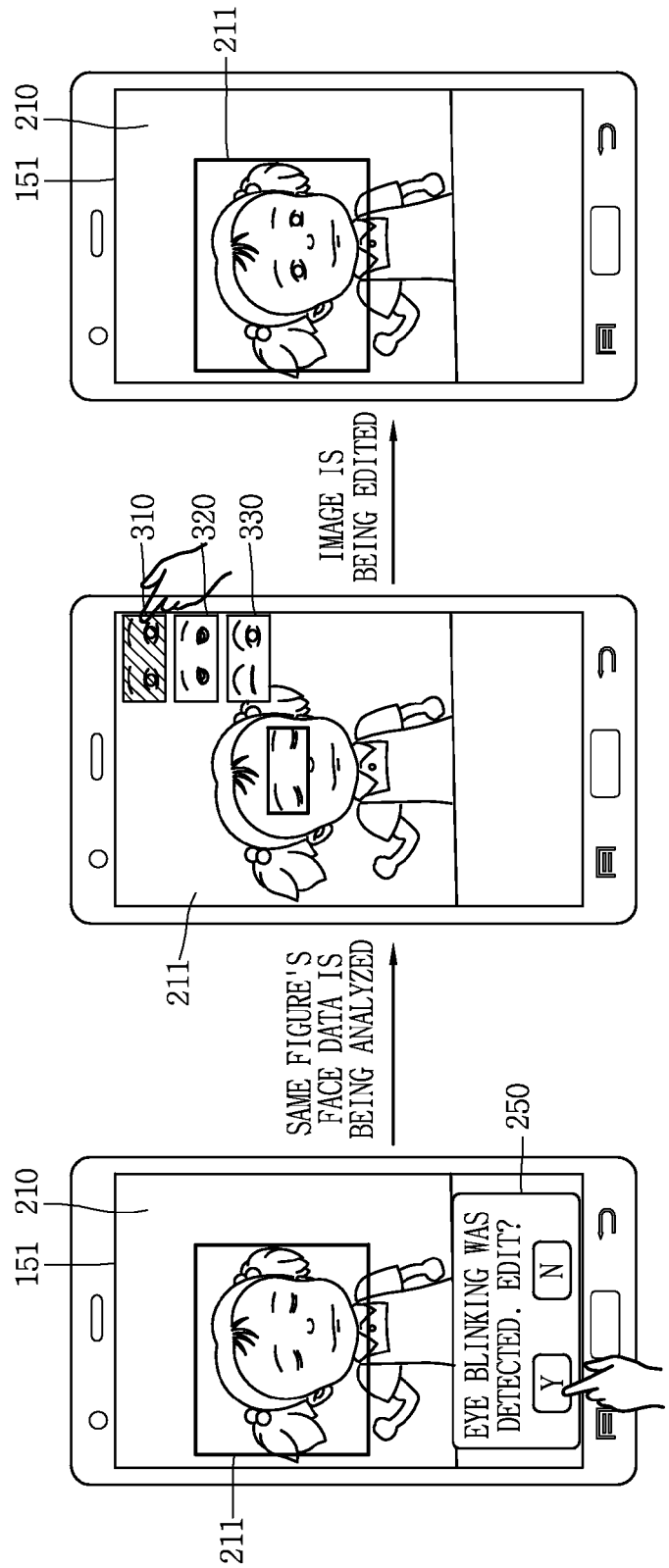
FIGS. 6A and 6B are conceptual diagrams for explaining a method of editing a region of the facial image in a mobile terminal according to an embodiment disclosed in the present disclosure.
Figure 6B:
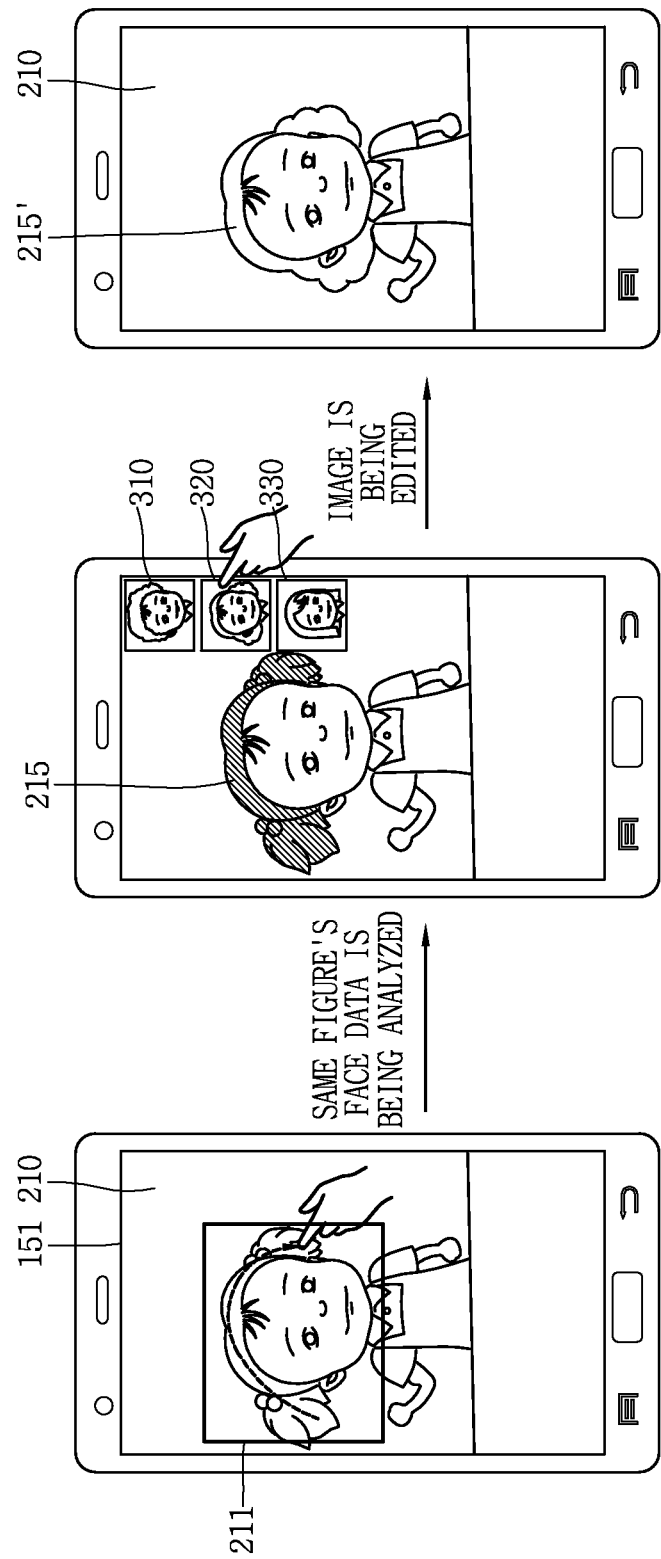

FIGS. 6A and 6B are conceptual diagrams for explaining a method of editing a region of the facial image in a mobile terminal according to an embodiment disclosed in the present disclosure.

First, a case of editing an image based on an edit condition will be described with reference to FIG. 6A.

When an image is displayed on the display unit 151 or an image received though a camera 121 or 121' (refer to FIGS. 2A and 2B) is displayed thereon based on the user's selection, the detection unit 181 determines whether the images correspond to an edit condition.

To this end, the detection unit 181 first detects a facial image from the image and determines whether the detected facial image satisfies an edit condition.

Here, the edit condition may be set to a case in which at least one region of the facial image does not satisfy a preset condition, and for example, an image with closed eyes, namely, eye blinking, may be set to an edit condition, or an expressionless face (based on the shape of his or her mouth) may be set to an edit condition.

The edit condition may be preset by the user's selection prior to displaying an image on the display unit 151, or may be also preset by the user's selection subsequent to displaying an image on the display unit 151.

When an edit condition is set to edit a facial image according to an embodiment as illustrated in FIG. 6A, the controller 180 first detects the facial image 211 from the image 210 displayed on the display unit 151.

For example, the edit condition is set to "eye blinking", the detection unit 181 or controller 180 determines whether a region corresponding to an "eye" in the facial image 211 corresponds to the edit condition.

When it corresponds to the edit condition as a result of the determination, at least one facial data (310, 320, 330) corresponding to the "eye" is displayed thereon.

Furthermore, when it corresponds to the edit condition, a popup window 250 may be displayed to notify user that the facial image 211 corresponds to the edit condition. In this case, facial data can be retrieved based on the user's selection, and the retrieval of facial data may be omitted when the user does not want to edit.

Meanwhile, if any one of facial data 310, 320, 330 that have been retrieved by the user is selected, then the controller 180 can edit the selected facial data 320 on the facial image 211.

As described above, a regional image corresponding to the edit condition is displayed as the facial data in FIG. 6A, but otherwise a full facial image may be also displayed thereon.

Furthermore, the controller 180 may configure that the quality information of the facial data 320 to be edited is same as the quality information of the facial image 211, thereby allowing the image to be naturally seen. In this case, the controller 180 may modify the picture quality information of the facial data 320 to correspond to the picture quality information of the facial image 211.

As described above, in a mobile terminal according to an embodiment disclosed in the present disclosure, it may be possible to edit a facial image only for a specific region corresponding to the edit condition in the facial image, thereby easily removing the user's undesired specific region.

Next, a method of editing an image corresponding to the edit region selected by the user will be described with reference to FIG. 6B.

When an image 210 is displayed on the display unit 151, and a specific region (or edit region) is selected through the user input unit 130 or the display unit 151 capable of receiving a touch input, the detection unit 181 detects a facial image 211 from the image 210. Then, the controller 180 retrieves facial data corresponding to the detected facial image 211. Then, the controller 180 retrieves facial data associated with the specific region. Here, the retrieved facial data is a figure's facial data having the same identity as the facial image.

As described above, when a region corresponding to the hair style 215 is selected through a drag input by the user, the controller 180 retrieves a figure's facial data having the same identity as the facial image 211, and displays the retrieved facial data 310, 320, 330. If any one of the retrieved facial data is selected, then the controller 180 edits an image using the selected facial data 320.

The process of selecting one edit region has been described in FIG. 6B, but a plurality of edit regions may be selected and the entire facial image can be also edited.

Furthermore, if a specific position is selected by the user from the facial image 211, then the controller 180 may automatically extract the selected position and a region having the same identity based on a boundary line contained in the selection position.

Accordingly, if the user selects one position on a head portion, then the controller 180 can extract the entire region corresponding to the head. Through this, it may be possible to reduce a burden that the user should carefully select an edit region.

Furthermore, the process of editing an "image" has been described in the foregoing embodiment, but according to the present invention, it may be also possible to edit only "picture quality information" in addition to editing the image. In other words, if facial data having the user's desired picture quality information (RGB, luminance, chroma, brightness, etc.) is selected, then the controller may edit a facial image to be edited with a value corresponding to the picture quality information.

As described above, the user's undesirable specific portion can be edited in a mobile terminal according to an embodiment disclosed in the present disclosure, thereby reducing the number of images that have been unnecessarily deleted due to the specific portion.

Figure 7:
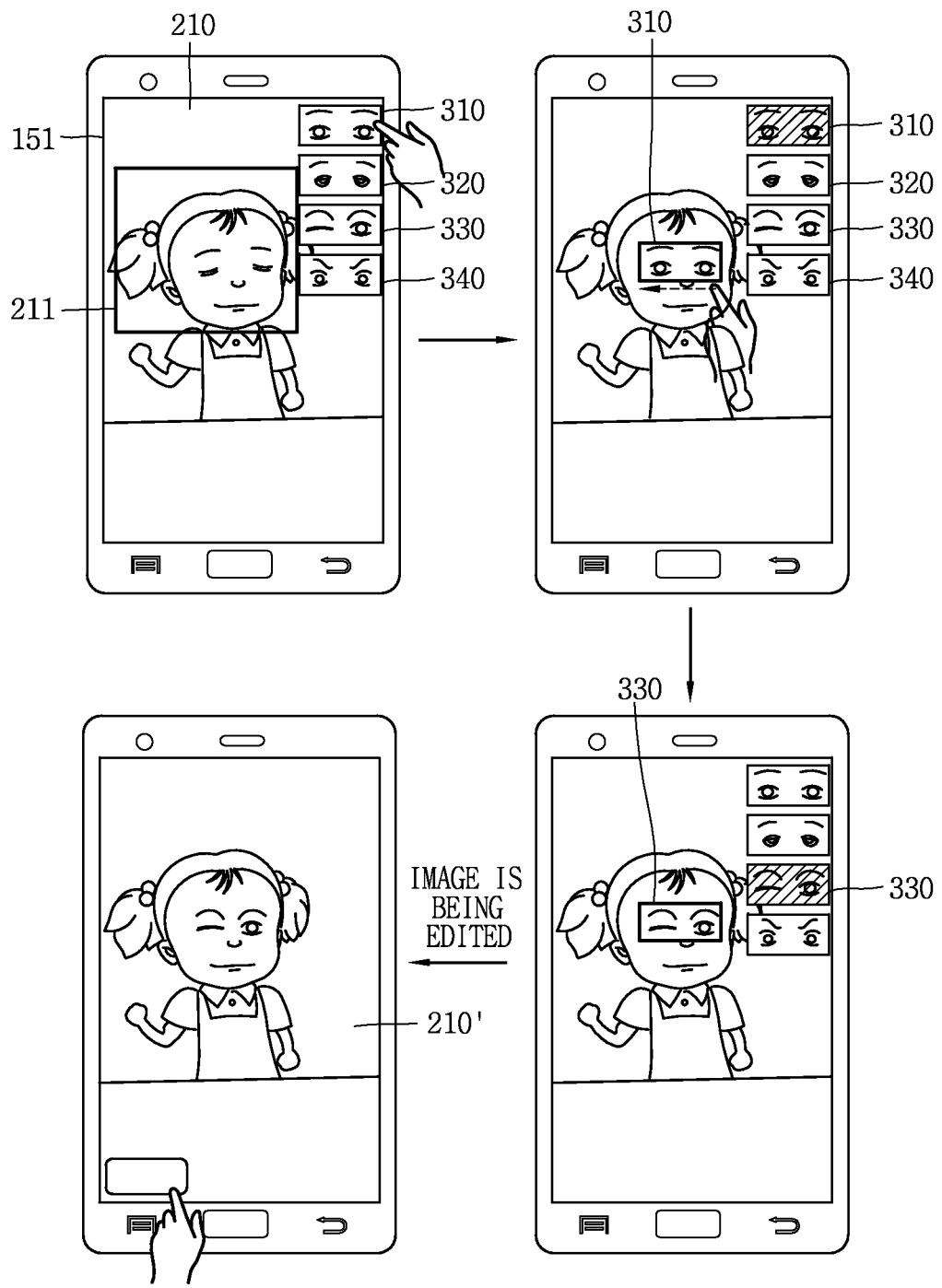
FIG. 7 is a conceptual diagram for explaining a method of providing a preview screen in a mobile terminal according to an embodiment disclosed in the present disclosure.

Hereinafter, a method of providing a preview screen for the retrieved facial data will be described with reference to FIG. 7. FIG. 7 is a conceptual diagram for explaining a method of providing a preview screen in a mobile terminal according to an embodiment disclosed in the present disclosure.

As described above, when facial data is retrieved to correspond to the user's selection, edit condition or edit region, the controller 180 may provide a preview screen for an edit image in which the retrieved facial data is applied to the facial image.

For example, when an "eye" region is set to an edit region to retrieve facial data 310, 320, 330 associated with the eye, and any one of the facial data is selected, the controller 180 displays the facial data 310 in a region corresponding to the eye of the facial image 211.

Furthermore, when a touch input is applied to the display unit 151 or a touch is received at the eye region, for example, when a flicking touch input is sensed on a preset region of the display unit 151, the controller 180 displays a preview screen in which another retrieved facial data is applied to the facial image 211.

Accordingly, the user can receive a preview screen in which the retrieved facial data is applied to a facial image, and a plurality of facial data is applied to the facial image through a simple manipulation, thereby editing a facial image using the most appropriate facial data.

Furthermore, in this case, the controller 180 may first provide a preset preview screen for facial data having the highest priority than that of the another facial data among the retrieved facial data.

As described above, the method of retrieving facial data for a figure corresponding to the retrieved facial image to edit the image has been described.

Hereinafter, a method of editing a facial image using facial data having an angle corresponding to the facial image as well as a figure corresponding to the detected facial image will be described with reference to FIG. 8.

FIG. 8 is a conceptual diagram for explaining a method of retrieving facial data corresponding to a specific condition in a mobile terminal according to an embodiment disclosed in the present disclosure.

When a facial image 211 is retrieved from the image 210 displayed on the display unit 151 by the detection unit 181, the controller 180 analyzes an angle of the detected facial image 211.

Then, the controller 180 retrieves facial data having an angle corresponding to the face angle of the facial image 211 as well as a figure's facial data having the same identity as the detected facial image 211.

As described above, the controller 180 analyzes a figure of the detected facial image 211. As a result of the analysis, when a face contained in the facial image 211 is rotated by "about 15 degrees in the right direction", the controller 180 retrieves facial data having an angle corresponding to the analyzed face angle among a first through a sixth facial data 310, 320, 330, 340, 350, 360 having the same identity as the facial image 211.

For example, when the first, fourth, fifth facial data 310, 340, 350 are retrieved and it is set to edit a region corresponding to the eye of the facial image, the controller 180 may extract only eye images 311, 341, 351 from the retrieved facial data 310, 340, 350 to provide them to the user.

As described above, facial data having an angle corresponding to the facial image desired to be edited is retrieved in a mobile terminal according to an embodiment disclosed in the present disclosure to edit an image with facial data corresponding to the angle, namely, naturally suitable facial data.

On the other hand, in the foregoing embodiment, a case of editing eye images has been described, but the entire facial image may be changed to another facial image using facial data in addition to a specific region of the facial image.

In the above, the process of changing a partial or entire region of the facial image to another facial image has been described.

Hereinafter, a method of editing an angle and direction of the facial image in an image displayed on the display unit will be described with reference to FIGS. 9A, 9B and 9C.

Figure 9A:
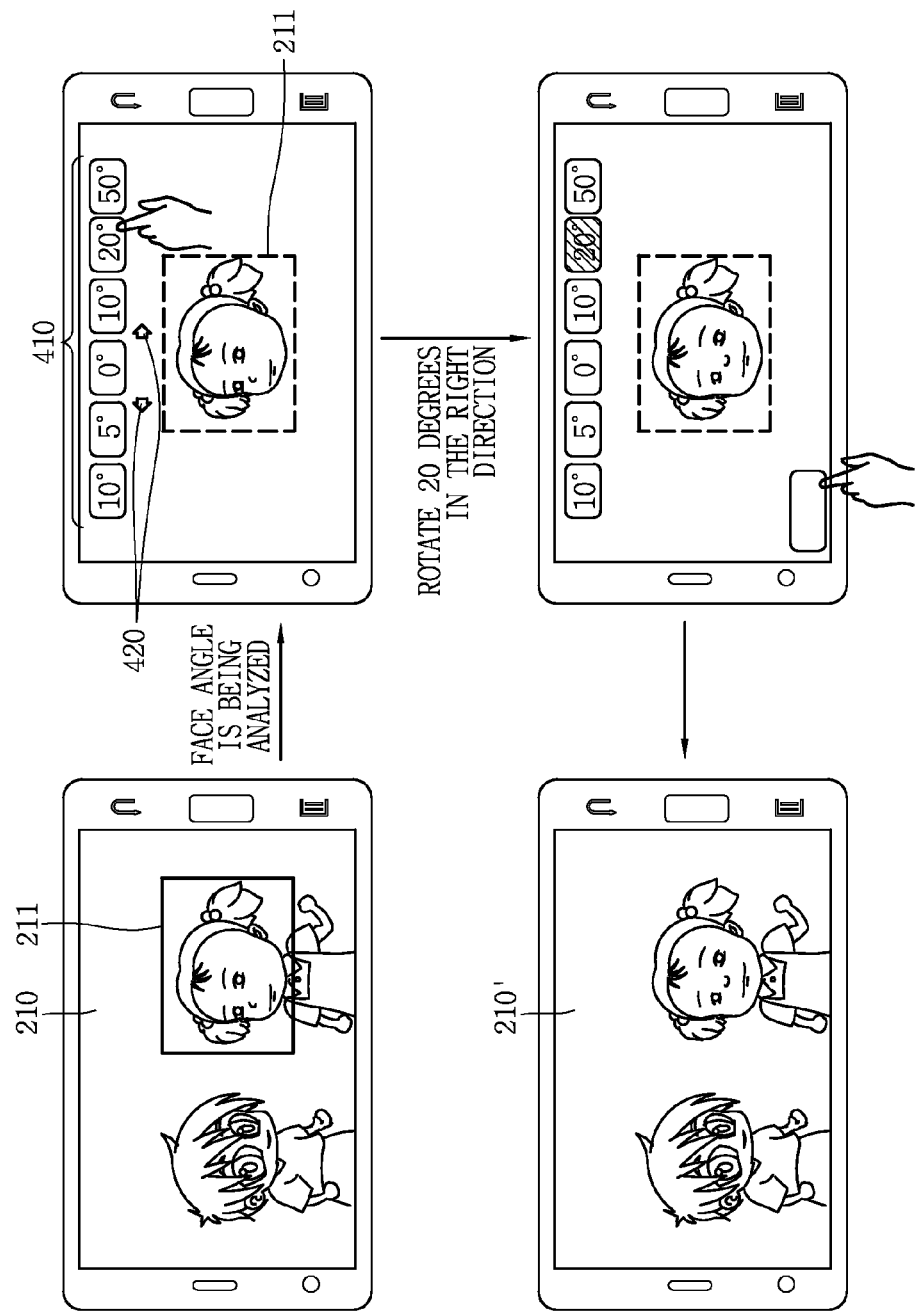
FIGS. 9A, 9B and 9C are conceptual diagrams for explaining a method of editing a facial image in a three-dimensional space and a method of generating three-dimensional facial data in a mobile terminal according to an embodiment disclosed in the present disclosure.
Figure 9B:
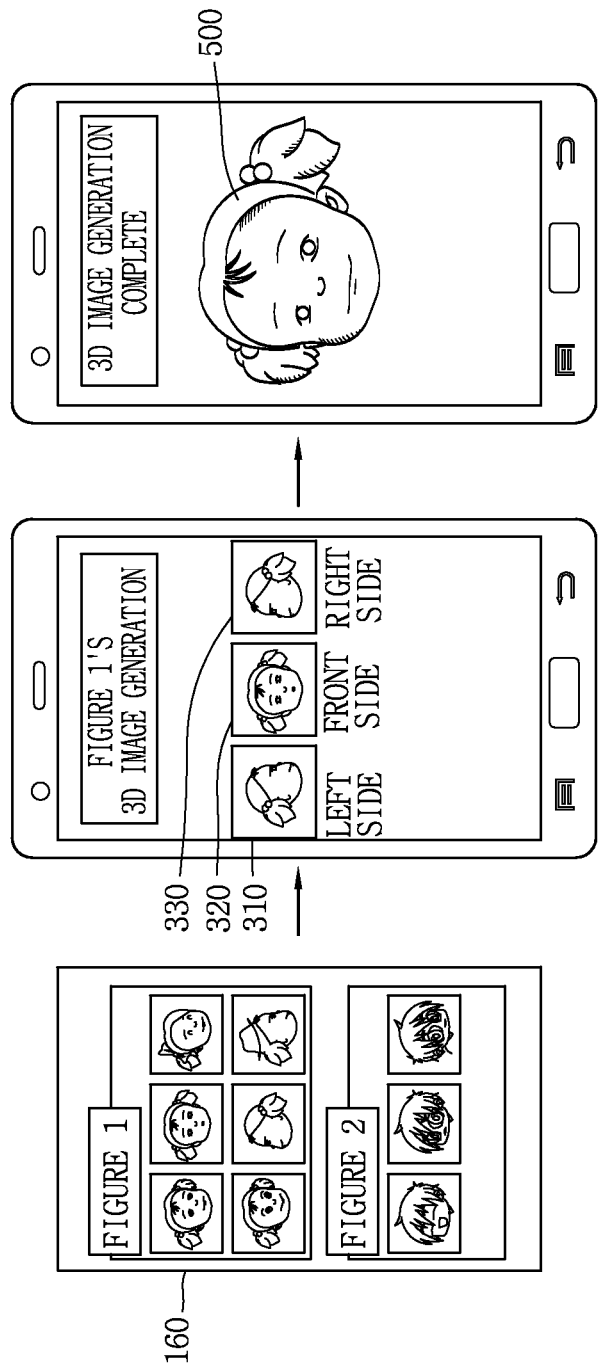
Figure 9C:
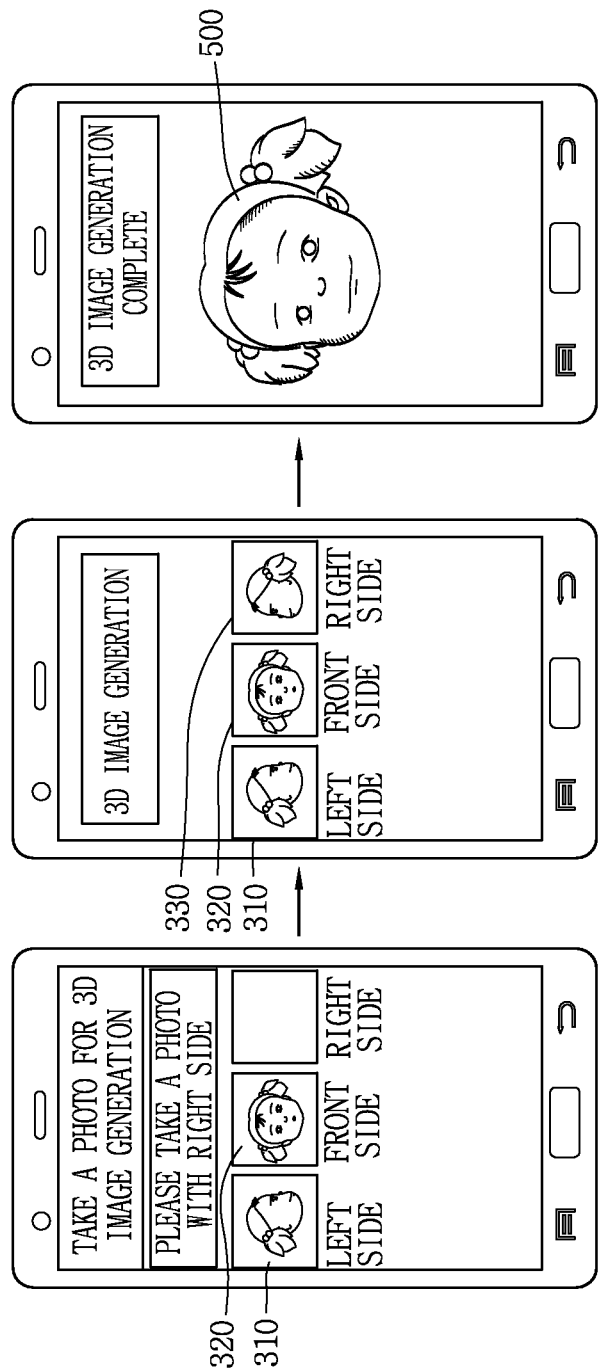

FIGS. 9A, 9B and 9C are conceptual diagrams for explaining a method of editing a facial image in a three-dimensional space and a method of generating three-dimensional facial data in a mobile terminal according to an embodiment disclosed in the present disclosure.

As illustrated in FIG. 9A, when a facial image 211 is detected from the image 210 in the detection unit 181 (refer to FIG. 3) and the facial image 211 is edited based on the user's selection or setting of the controller 180, the controller 180 may change a face angle of the facial image 211.

For a method of entering an angle change mode for changing the face angle of the facial image 211, there exist various embodiments such as selecting a specific icon by the user or the like, and thus the detailed description will be omitted.

As illustrated in the drawing, the controller 180 outputs information on at least one of the angle and direction capable of changing the detected facial image 211.

In this case, the controller 180 first retrieves facial data corresponding to the facial image 211. Then, the controller 180 analyzes a changeable rotation direction and angle of the facial image 211 using the facial data.

The controller 180 may output information on the angle and direction through a plurality of icons 410, 420 on the display unit 151, and rotate the facial image in the angle and direction based on the user's selection among the outputted icons.

As illustrated in the drawing, when a "rotate 20 degrees in the right direction" icon is selected by the user, the controller 180 rotates the facial image 211 by "20 degrees in the right direction", and when a "select" icon is selected by the user, the controller edits the image 210 using the facial data rotated by 20 degrees in the right direction compared to "the facial image."

Here, the facial data rotated by "20 degrees in the right direction" may be different from the detected facial image 211 in at least one of expression, hair style, and the like. It is because the controller 180 edits a facial image using the pre-stored facial data.

As described above, the controller 180 collects facial data (or facial images) having various angles corresponding to the same figure as the facial image 211 in the memory 160 or web to correspond to the "angle change command." Then, the controller 180 may analyze a rotatable face angle and direction of the facial image 211 through the collected faces, and the output the analyzed information to the user.

Furthermore, the controller 180 may store the angle and direction information in advance through the analysis of facial data corresponding to the same figure even prior to receiving an "angle change command."

Furthermore, the controller 180 may edit an angle of the facial image 211 using facial data corresponding to a two-dimensional image as described above, but also generate a three-dimensional image using facial data corresponding to the two-dimensional image, and then edit an angle of the facial image 211 using a three-dimensional image.

Even in this case, the controller 180 may output the angle and direction information to the user as illustrated in FIG. 9A, and then edit a facial image to correspond to the user's selected angle and direction, and in this case, the conventional facial image 211 may be outputted as a three-dimensionally changed facial image.

Hereinafter, a method of generating a three-dimensional image will be described in detail with reference to FIGS. 9B and 9C.

First, the controller 180 (refer to FIG. 3) combines facial data stored in the memory 160 or web server to generate a three-dimensional image.

A method of generating a three-dimensional image using facial data stored in the memory 160 will be described, for example, with reference to 9B. The controller 180 combines facial data, namely, images, contained in one of the groups divided on the basis of figures to generate a three-dimensional image. Even if the memory 160 is not grouped on the basis of figures, the controller 180 can extract facial images corresponding to the same figure using a face recognition algorithm or the like, and generate a three-dimensional image using the extracted facial image.

As described above, when there exist a plurality of images (or facial data) for the same figure, the controller 180 analyzes an angle of the image as illustrated in FIG. 9B. For example, the controller 180 detects a front image, a left-side image, and a right-side image, respectively, from the plurality of images, and combines the detected images to generate a three-dimensional image. Meanwhile, in the above example, the method of combining images 310, 320, 330 in three directions (front, left-side, right-side) to generate a three-dimensional image has been described, but the controller 180 may also generate a more stereoscopic three-dimensional image 500 using images with more subdivided various angles and directions.

Furthermore, in addition to the process of using facial data stored in the memory 160 or web server, the controller 180 may capture facial images 310, 320, 330 with various angles using the camera 121 or 121' (refer to FIGS. 2A, 2B and 3) as illustrated in FIG. 9C, and then generate a three-dimensional image 500 using the captured images.

As described above, a mobile terminal according to an embodiment of the present disclosure may change and edit the angle and direction of the entire facial image to satisfy the user's preference, and generates a three-dimensional image to edit a facial image using the three-dimensional image, thereby obtaining a more vivid image.

Next, a method of editing an image captured through the camera using the best image will be described with reference to FIGS. 10 and 11.

Figure 10:
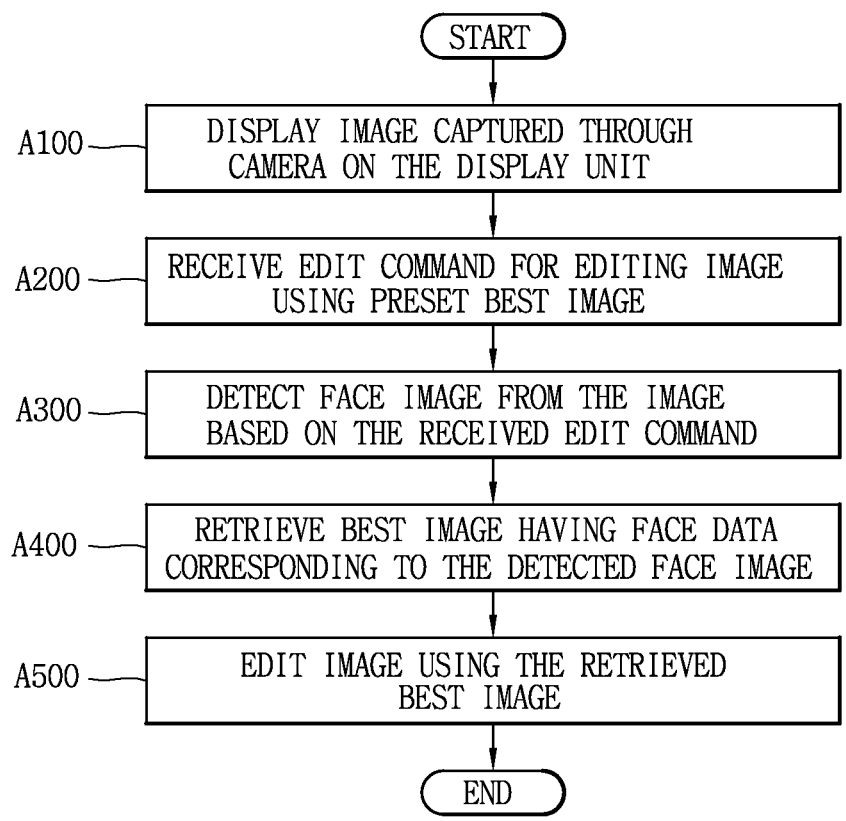
FIG. 10 is a flow chart for explaining a control method of editing an image captured by a camera in a mobile terminal according to an embodiment disclosed in the present disclosure.
Figure 11:
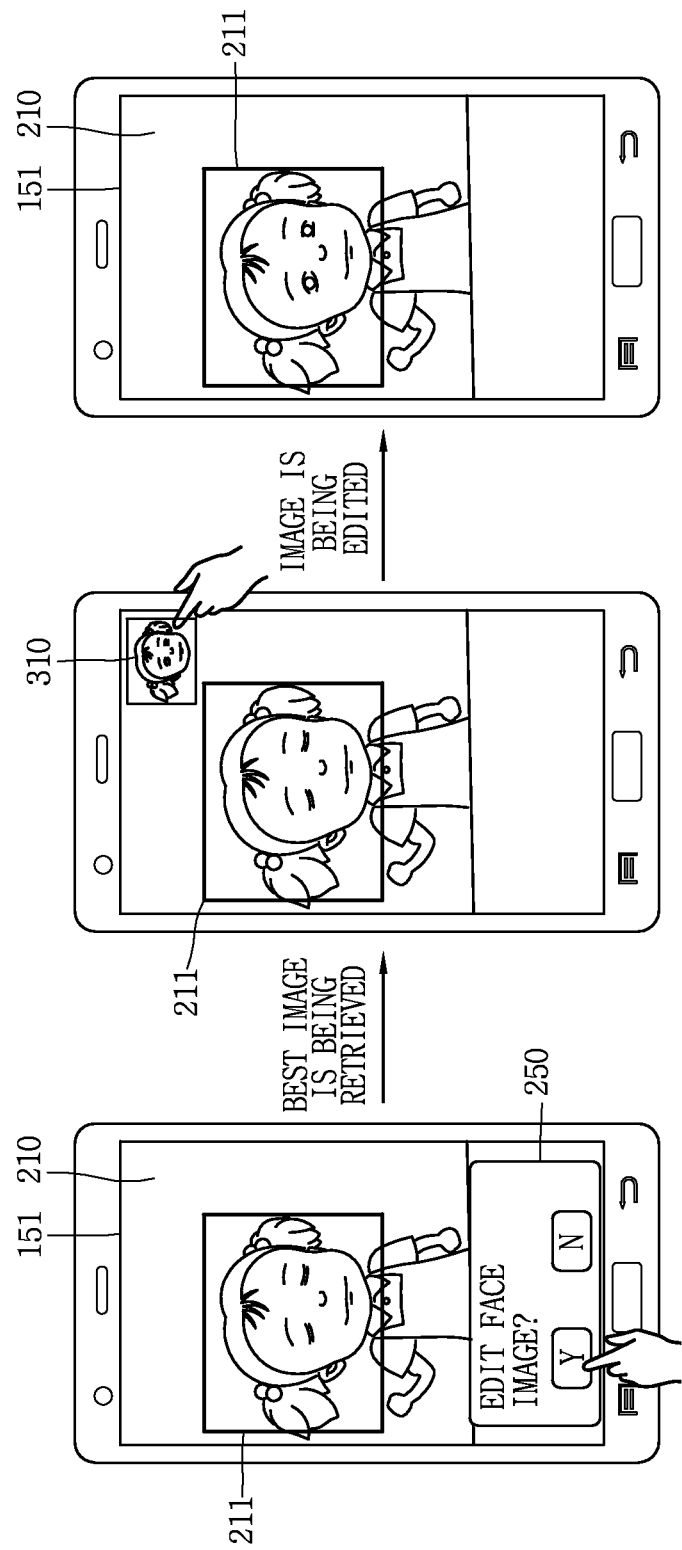
FIG. 11 is a conceptual diagram for explaining a control method of editing an image captured by a camera in a mobile terminal according to an embodiment disclosed in the present disclosure.

FIG. 10 is a flow chart for explaining a control method of editing an image captured by a camera in a mobile terminal according to an embodiment disclosed in the present disclosure, and FIG. 11 is a conceptual diagram for explaining a control method of editing an image captured by a camera in a mobile terminal according to an embodiment disclosed in the present disclosure.

First, when an image is captured through the camera 121 or 121', the controller 180 displays the captured image on the display unit 151.

Then, the controller 180 receives an edit command for editing an image using the preset best image from the user (A200).

Here, the preset best image relates to an image to be used for editing the facial image, which is an image selected by the user, when an image is captured through the camera 121 or 121' and a facial image contained in the captured image is edited.

Only one best image can be set, but also a plurality of best images can be set. Furthermore, even if the best image is not explicitly set, the controller 180 can use a figure's image corresponding to the facial image stored in the memory 160 and contained in the captured image.

A method of receiving an edit command will be described, for example, with reference to FIG. 11.

When an image is captured through the camera, the controller 180 displays the captured image 210 on the display unit 151 as illustrated in FIG. 11.

Then, the controller 180 outputs a popup window 250 for selecting a "facial image" edit. On the popup window 250, the user selects the "Y" icon, thereby allowing the controller 180 to receive an edit command.

On the other hand, the controller 180 may display the popup window 250 all the time whenever an image is captured through the camera 121 or 121', but an image may be captured without displaying the popup window 250 and then selected by the user through a function menu.

In this manner, when an edit command is received, the detection unit 181 detects a facial image from the image displayed on the display unit using a face recognition algorithm based on the received edit command (A300; refer to FIG. 10).

For example, as illustrated in FIG. 11, the detection unit 181 detects the facial image 211 from the image 210 displayed on the display unit 151.

Then, the controller 180 retrieves facial data corresponding to the facial image 211, namely, the best image of the same figure as the facial image 211 from the memory 160 (A400; refer to FIG. 10).

Here, there may exits one best image or a plurality of best images as described above.

Next, the controller 180 edits the image displayed on the display unit using the retrieved best image (A500).

Meanwhile, in case that there exists one retrieved best image, the controller 180 immediately edits the captured image using the one best image. In case that there exist a plurality of the retrieved best images, any one of the plurality of best images may be selected by the user to edit the image.

Meanwhile, for a region in which the captured image is edited using the best image, only a region corresponding to an "edit condition" in the captured image may be edited as described above.

Furthermore, as described above, only a region selected by the user in the captured image may be edited, and the entire facial image contained in the captured image may be also changed to the best image.

For example, as illustrated in FIG. 11, when an edit command is received based on the user's selection, the controller 180 retrieves the best image corresponding to the detected facial image 211.

Furthermore, as an example, when there exists one retrieved best image, and editing the entire facial image 211 as the retrieved best image 310 is selected, the controller 180 edits the image 210 such that the facial image 211 is changed to the best image 310.

As described above, a mobile terminal according to the present disclosure may edit an image based on the user's selection in a state that the image is captured through a camera, and as a result, even when an image contrary to the user's intention is captured, the image can be improved.

Figure 12:
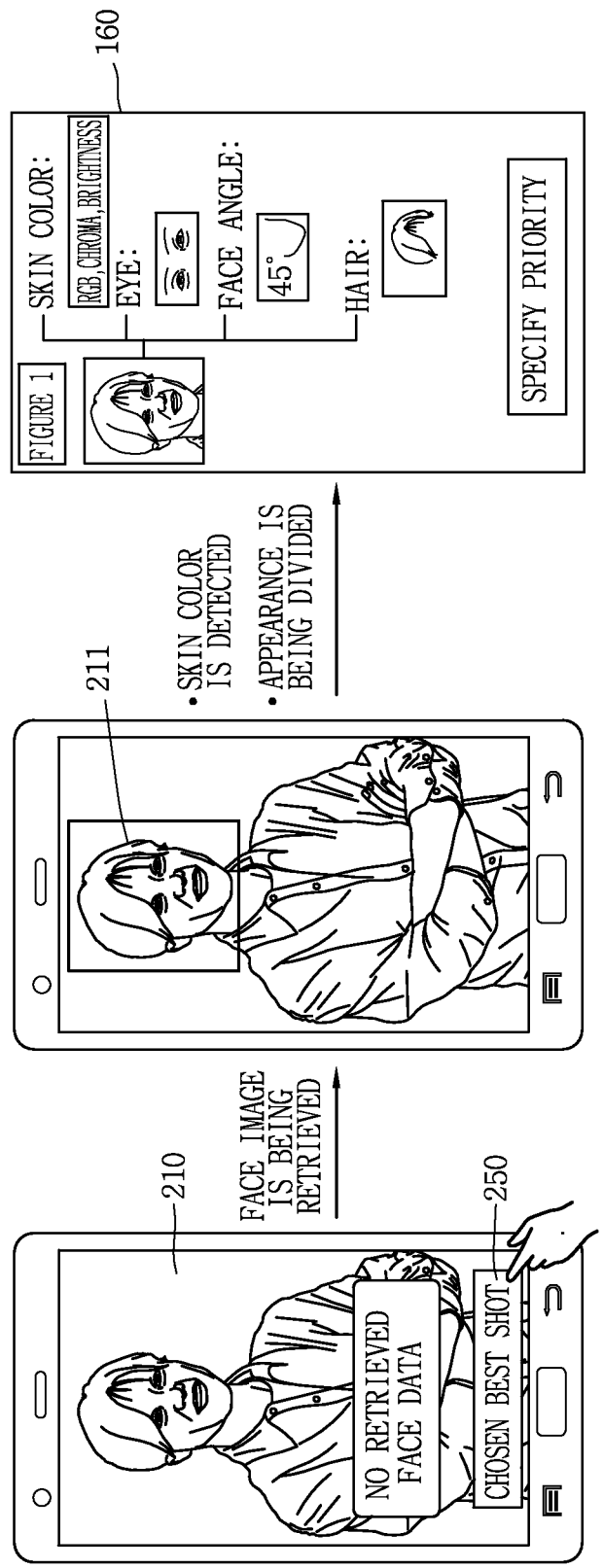
FIG. 12 is a conceptual diagram for explaining a method of generating facial data using an image captured by a camera in a mobile terminal according to an embodiment disclosed in the present disclosure.

FIG. 12 is a conceptual diagram for explaining a method of generating facial data using an image captured by a camera in a mobile terminal according to an embodiment disclosed in the present disclosure. As described above, in addition to the process of editing an image captured through the camera 121 or 121', the controller 180 may generate the best image using the captured image.

As illustrated in FIG. 12, when an image is captured by the camera 121 or 121', the controller 180 receives an input for selecting whether to generate facial data using the displayed image 210 from the user.

When there exists no preset best image associated with the displayed image 210, the controller 180 may select "whether to generate facial data."

For example, when "edit image" is selected by the user as illustrated in FIGS. 10 and 11 and there exists no corresponding facial data as a result of retrieving facial data corresponding to the captured image, the controller 180 may output a popup window containing a "select best shot" icon 250 as illustrated in FIG. 12.

As described above, when the "select best shot" icon 250 is selected by the user, the detection unit 181 detect the facial image 211 from the displayed image 210. Then, the controller 180 detects various visual information and skin color information from the detected facial image 211. The controller 180 detects skin color information, namely, color information (RGB, luminance, chroma, brightness, etc.) corresponding to the facial image 211, and discerns and detects his or her eyes, nose, mouth, face angle, hair style for each region. Then, the controller 180 stores the facial data in the memory 160.

In this case, when there exists a group (or folder, category) associated with a figure's facial data corresponding to the facial image 211 of the displayed image 210 in the memory 160, the controller 180 adds the facial data to the existing group without generating an additional group.

Furthermore, when there exists no group (or folder, category) associated with a figure's facial data corresponding to the facial image 211 of the displayed image 210 in the memory 160, the controller 180 generates an additional group for storing facial data associated with the figure to store the facial data.

Furthermore, the controller 180 may set a priority of the facial data associated with the facial image 211 based on the user's selection. In other words, when the priority of the facial data is set to the "first" priority by the user, the controller 180 may first of all provide the facial data of the facial image 211 to the user when editing the same figure's facial image as the figure corresponding to the facial image 211 later.

Furthermore, though not shown in the drawing, when an image is captured using the camera 121 or 121' (refer to FIGS. 2A, 2B and 3) in a mobile terminal according to an embodiment disclosed in the present disclosure, it may be possible to change a setting of the camera such that an image received through the camera corresponds to facial data (best image) set by the user.

For example, when the user desires the picture quality information of an image to be captured through the camera 121 or 121' to correspond to the picture quality information of the facial data stored in the memory 160 or the like, a setting value of the camera 121 or 121' may be changed to correspond to the user's desired facial data based on the user's selection.

In other words, the controller may change a setting value of the camera such that the setting of the camera such as luminous intensity, white balance, and exposure value for the camera corresponds to the facial data.

Accordingly, in a mobile terminal according to an embodiment disclosed in the present disclosure, the color expression and picture quality of an image being captured may be controlled to exhibit the user's desired level.

Furthermore, though not shown in the drawing, when an image captured through the camera 121 or 121' is stored in a mobile terminal according to an embodiment disclosed in the present disclosure, the controller 180 may store the identification information, such as name, phone number or the like, of a figure corresponding to the facial image in addition to the facial image contained in the image.

In other words, when storing the image, the controller 180 may detect a facial image contained the image using a recognition algorithm, and receive the identification information of a figure from the user to match it to the detected facial image. Then, the matched identification information and facial image can be stored in the figures database contained in the memory 160.

Furthermore, when storing the matched information in the figures database, the controller 180 may store the matched information in a figure group for which information corresponding to the facial image is stored.

Furthermore, even when the identification information of a figure is not received from the user, the controller 180 may retrieve a figure group containing information corresponding to the detected facial image, thereby allowing the facial image to be stored in the retrieved figure group.

In addition, the controller 180 may compare a facial image stored in the phone number, e-mail, or the like with the detected facial image, and extract the identification information of a figure contained in the phone number or e-mail, such as name, contact address or the like when they are the same figure as a result of the comparison.

Then, the controller 180 may store the extracted identification information to be matched to a facial image contained in the captured image, and retrieve a figure group corresponding to the identification information from the figure groups stored in the memory 160, and store the facial image in the retrieved group.

As described above, when storing an image captured by the camera in a mobile terminal disclosed in the present disclosure, identification information may be matched to a facial image contained in the image, thereby allowing the facial image to be stored in a figure group corresponding to the same figure.

Accordingly, when editing another image next time, the another image may be edited using the facial image.

Furthermore, in a mobile terminal according to an embodiment disclosed in the present disclosure, when the image displayed on the display unit 151 is an image posted in a website for which a third person is a manager, the image can be edited through a predetermined authentication procedure.

Figure 13:
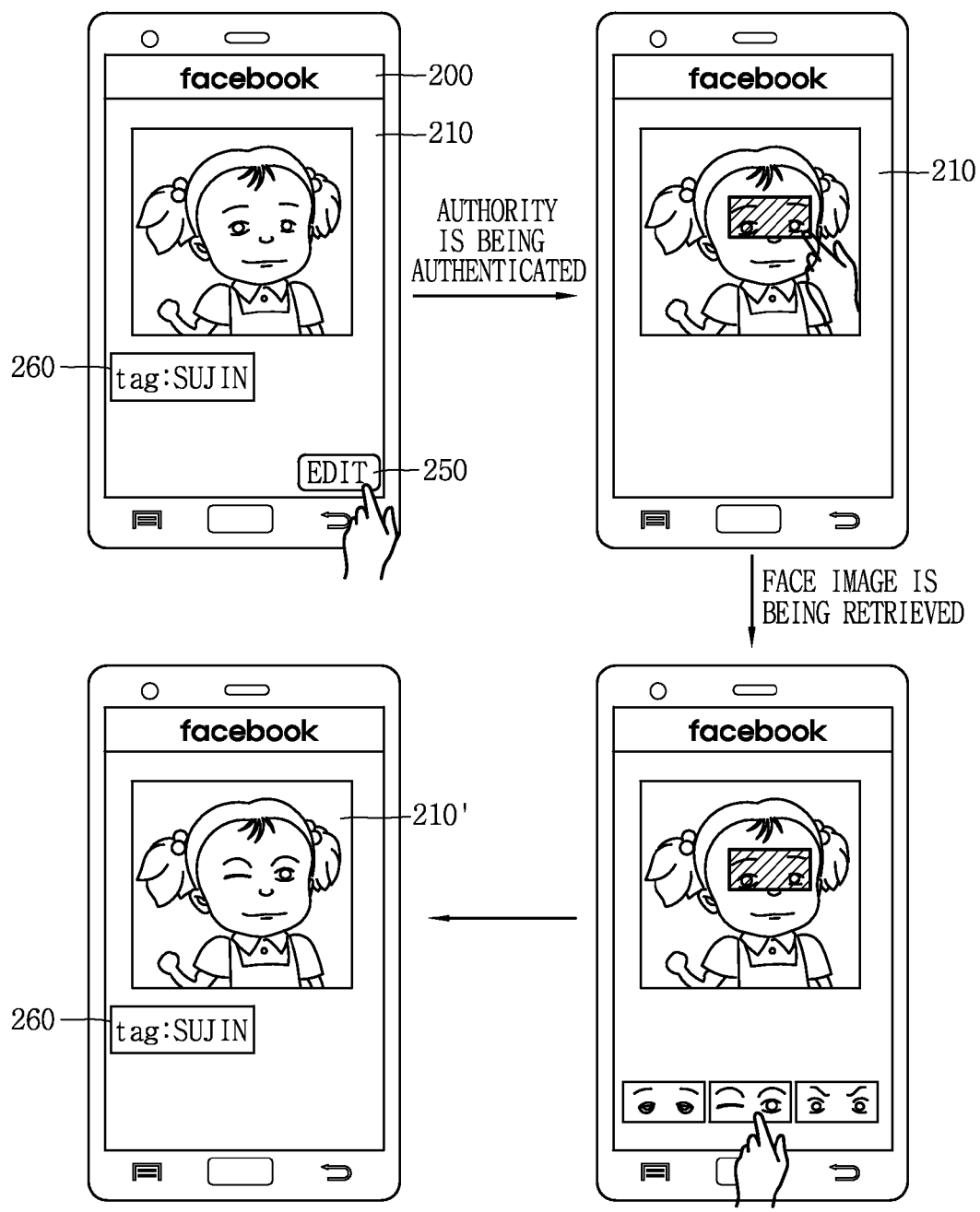
FIG. 13 is a conceptual diagram for explaining a method of editing a facial image on a web using a mobile terminal according to an embodiment disclosed in the present disclosure.

FIG. 13 is a conceptual diagram for explaining a method of editing a facial image on a web using a mobile terminal according to an embodiment disclosed in the present disclosure.

For example, as illustrated in FIG. 13, when the user desires to edit his or her own image 210 posted in a website for which a third person is a manager, the user selects an "edit" icon 250.

Then, the controller 180 performs authentication for whether or not the user desiring to edit the image 210 has authority for editing the posted content.

There exist various embodiments for the method of authenticating authority. For example, when the information of a tag 260 contained in posted content is matched to the user's information, namely, when a name contained in the tag 260 is the user's name, the controller 180 can authorize him or her to edit the posted content.

As shown in the above example, when the authority for editing the posted content is allowed, the user selects a portion desired to edit in the image 210, and edits the image 210 using any one of the retrieved facial data, and then updates the edited image 210' on the website.

As described above, in a mobile terminal and a control method thereof according to an embodiment disclosed in the present disclosure, the user's own image can be edited in an image posted by the third person, thereby preventing his or her facial image contrary to his or her intention from being exposed to others.

Furthermore, in a mobile terminal and a control method thereof according to an embodiment of the present disclosure, the same figure's image as the figure corresponding to the facial image desired to be edited can be retrieved, and the facial image can be edited using the retrieved image, thereby providing a naturally edited facial image.

Furthermore, in a mobile terminal and a control method thereof according to an embodiment of the present disclosure, the user's undesirable specific portion can be edited in an image captured through the camera, thereby reducing the number of images that have been unnecessarily deleted due to the specific portion.

The configurations and methods according to the above-described embodiments will not be applicable in a limited way to the foregoing mobile terminal, and all or part of each embodiment may be selectively combined and configured to make various modifications thereto.

What is claimed is:

1. A mobile terminal, comprising:
a display unit configured to display an image;
a detection unit configured to detect a facial image from the image; and
a controller configured to:
retrieve facial data corresponding to the facial image, and edit the facial image using the facial data, and
display at least one preview screen in which the facial data is applied to the facial image,
wherein, when the facial data comprises multiple image data, a preview screen comprising the most preferred image data among the multiple image data is displayed first among preview screens.

2. The mobile terminal of claim 1, wherein the facial data is retrieved when the facial image corresponds to an edit condition.

3. The mobile terminal of claim 2, wherein the controller is further configured to receive at least one edit region set in the facial image, and retrieve a portion of the facial data corresponding to the edit region.

4. The mobile terminal of claim 2, wherein the edit condition is set based on at least one of a visual information of the facial image or a picture quality information of the facial image, and
the controller is further configured to edit a region in the facial image which corresponds to the edit condition using the facial data.

5. The mobile terminal of claim 4, wherein when an eye blinking is detected from the region of the facial image, an eye image retrieved from the facial data is used to edit the eye blinking detected in the region of the facial image.

6. The mobile terminal of claim 1, wherein when the facial data is retrieved, the controller is further configured to control the display unit to display the preview screen where the facial data is applied to the facial image.

7. The mobile terminal of claim 1, wherein the controller is further configured to control the display unit to display a corresponding number of preview screens to edit the facial image based on a selection input selecting at least one of the multiple image data.

8. The mobile terminal of claim 1, wherein the controller is further configured to analyze an angle of the facial image, and a picture corresponding to the angle is retrieved from the facial data.

9. The mobile terminal of claim 1, further comprising a camera configured to capture the image, and
the controller is further configured to detect a picture quality information from the facial data corresponding to the facial image, and configure the camera to adjust a picture quality of the facial image according to the picture quality information.

10. The mobile terminal of claim 9, wherein the controller is further configured to change at least one of luminous intensity, white balance, or exposure value for the camera.

11. The mobile terminal of claim 1, wherein the facial data comprises a three-dimensional image, and
the controller is further configured to change an angle of the facial image using the three-dimensional image.

12. The mobile terminal of claim 11, wherein the controller is further configured to control the display unit to display information associated with angles and directions changeable through the three-dimensional image, and
the controller is further configured to edit the facial image with at least one of a selected angle and a selected direction from the information.

13. The mobile terminal of claim 11, wherein the three-dimensional image is generated through combining a plurality of perspective images of an object.

14. The mobile terminal of claim 13, wherein the three-dimensional image is generated using a front side, a left side and a right side image selected from the plurality of perspective images of the object.

15. The mobile terminal of claim 1, wherein the facial data comprises at least one image corresponding to a face of a figure,
the at least one image is retrieved from a memory of the mobile terminal or a website via the Internet, and
the at least one image is classified into one of a plurality of groups, the one of the plurality of groups is linked to the figure.

16. The mobile terminal of claim 15, wherein the controller is further configured to detect the one of the plurality of groups containing the at least one image, and edit the facial image using the at least one image contained in the group.

17. A method of controlling a mobile terminal, the method comprising:
displaying an image captured through a camera to a display unit;
receiving an edit command for editing the image;
detecting a facial image from the image in response to a receipt of the edit command;
retrieving an optimal image comprising facial data which corresponds to the facial image; and
editing the image using the optimal image; and
displaying at least one preview screen in which the facial data is applied to the facial image,
wherein, when the facial data comprises multiple image data, a preview screen comprising the most preferred image data among the multiple image data is displayed first among preview screens comprising the multiple image data.

18. The method of claim 17, further comprising:
outputting a popup window operable for selecting whether or not to edit the image when the image is captured through the camera, and receiving the edit command through the popup window.

19. The method of claim 18, wherein the popup window comprises a first icon for storing the facial image captured by the camera as the optimal image, and the facial image is extracted and stored as the optimal image when the first icon is selected.

* * * * *